United States Patent
Jang

(10) Patent No.: US 10,204,543 B2
(45) Date of Patent: Feb. 12, 2019

(54) ORGANIC LIGHT EMITTING DIODE DISPLAY DEVICE AND OPERATING METHOD THEREOF

(71) Applicant: LG ELECTRONICS INC., Seoul (KR)

(72) Inventor: Joonduk Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 15/293,943

(22) Filed: Oct. 14, 2016

(65) Prior Publication Data

US 2017/0330502 A1   Nov. 16, 2017

(30) Foreign Application Priority Data

May 13, 2016   (KR) .................. 10-2016-0058614

(51) Int. Cl.
| | |
|---|---|
| *G06F 1/00* | (2006.01) |
| *G09G 3/20* | (2006.01) |
| *G09G 3/3225* | (2016.01) |
| *G09G 3/3233* | (2016.01) |
| *G09G 3/3291* | (2016.01) |
| *G06F 3/02* | (2006.01) |

(52) U.S. Cl.
CPC ......... *G09G 3/2092* (2013.01); *G09G 3/3225* (2013.01); *G09G 3/3233* (2013.01); *G09G 3/3291* (2013.01); *G06F 3/02* (2013.01); *G09G 2320/0626* (2013.01); *G09G 2330/021* (2013.01); *G09G 2354/00* (2013.01)

(58) Field of Classification Search
CPC .. G09G 5/00; G09G 3/20; G09G 3/32; G09G 2/2007; G09G 3/3225; G09G 2320/0626; G09G 1/00; G09G 2320/0233; G09G 3/3233; G06F 3/02
See application file for complete search history.

(56) References Cited

U.S. PATENT DOCUMENTS

| | | | |
|---|---|---|---|
| 2012/0019506 A1* | 1/2012 | Hekstra | G09G 3/3233 345/212 |
| 2012/0050565 A1* | 3/2012 | Imai | H04N 5/23293 348/224.1 |
| 2016/0104411 A1* | 4/2016 | Nathan | G09G 3/2007 345/690 |

FOREIGN PATENT DOCUMENTS

WO    2014088975    6/2014

OTHER PUBLICATIONS

Extended European Search Report in European Application No. 16188872.2, dated Jun. 9, 2017, 9 pages (with English translation).

* cited by examiner

*Primary Examiner* — Michael A Faragalla
(74) *Attorney, Agent, or Firm* — Fish & Richardson P.C.

(57) ABSTRACT

An organic light emitting diode (OLED) display device, comprises: a power supply unit configured to supply a voltage to an OLED; and a control unit configured to control the power supply unit to supply a first minimum voltage for maintaining luminance corresponding to a brightness set value to the OLED.

6 Claims, 15 Drawing Sheets

HIL : Hole Injection Layer
HTL : Hole Transfer Layer
EML : Emitting Layer
ETL : Electron Transfer Layer

FIG. 13

|  | OLED BRIGHTNESS SET RANGE | VOLTAGE |
|---|---|---|
| 55" | 0~80 | 20V |
|  | 0~100 | 22V |
| 65" | 0~70 | 20V |
|  | 0~90 | 22V |
|  | 0~100 | 24V |

ORGANIC LIGHT EMITTING DIODE DISPLAY DEVICE AND OPERATING METHOD THEREOF

CROSS-REFERENCE TO RELATED APPLICATIONS

The present application claims the benefit of priority to Korean Patent Application No. 10-2016-0058614, filed on May 13, 2016, which is herein incorporated by reference in its entirety.

BACKGROUND

The present invention relates to a display device and a method of operating a display device.

Recently, with the increasing use of various types of smart devices and high-resolution large screens, various types of display devices have been also developed. In particular, various types of flat panel displays (FPD) with reduced weight and volume than those of a cathode ray tube (CRT) display that was known as the "Braun tube" display have been developed. Specifically, the flat panel displays have been emerged in the market, for example, thin-film field-effect transistor liquid crystal displays (TFT-LCD), plasma display panels (PDP), and electroluminescence (EL) devices.

On the other hand, the EL devices may be classified into an inorganic light emitting display device and an organic light emitting display device (OLED). The OLED uses the electroluminescence phenomenon in which light emission occurs when a current flows through organic fluorescence compound. Therefore, the OLED has self-emissive organic material and low power consumption and is made lightweight and thin. Also, since each OLED is a self-emitting device, light is adjustable by changing current flowing through each OLED, so that there is no need for a backlight. Therefore, the OLED display device has advantages of a rapid response speed, high emission efficiency, high luminance, and wide viewing angle.

The OLED display devices have a promising future because of the above-described advantages, and the demand for the OLED display devices has increased. In addition, there is a need for a method of reducing power consumption in the OLED display device.

Therefore, the method of reducing power consumption in the OLED display device may be devised. In particular, a method of lowering a voltage to be supplied to an OLED may be considered as the method of reducing power consumption in the OLED display device. However, when the voltage is simply lowered without considering luminance of the OLED display device, there may occur a problem that the luminance may be lowered along with reduction in power consumption. Therefore, it is not considered that the primary issue for the power consumption of the OLED display device has been resolved.

SUMMARY

The present invention provides a method of reducing power consumption in an OLED display device.

The present invention provides a method of reducing power consumption while maintaining luminance in an OLED display device.

In addition, the present invention provides a method of reducing power consumption while maintaining luminance in an OLED display device by supplying an optimal voltage according to a secondary color distribution in an OLED display device.

In one embodiment, an organic light emitting diode (OLED) display device, includes a power supply unit configured to supply a voltage to an OLED; and a control unit configured to control the power supply unit to supply a first minimum voltage for maintaining luminance corresponding to a brightness set value to the OLED.

The OLED display device may further include a storage unit configured to store a first lookup table in which voltages for maintaining luminance are respectively mapped to brightness set values.

The first minimum voltage may be determined to be a smallest voltage of voltages acquired from the first lookup table.

The first lookup table may be periodically updated at a preset period.

The brightness set value may be changed according to a command received from a remote control device, and the control unit may be configured to control the power supply unit to supply a second minimum voltage for maintaining luminance corresponding to the changed brightness set value to the OLED.

The storage unit may further store a second lookup table in which voltages for maintaining luminance are mapped to a plurality of secondary color distributions, and the control unit may be configured to perform sensing to detect a secondary color of the OLED, and control the power supply unit to supply the first minimum voltage to the OLED when the secondary color is not detected as a result of the sensing.

The storage unit may further store a second lookup table in which voltages for maintaining luminance are mapped to a plurality of secondary color distributions, the control unit may be configured to perform sensing to detect a secondary color of the OLED; and, when the secondary color is detected as a result of the sensing, analyze a secondary color distribution, acquire a third minimum voltage corresponding to the analyzed secondary color distribution from the second lookup table and control the power supply unit to supply the third minimum voltage to the OLED, and the third minimum voltage may be a voltage higher than the first minimum voltage.

In another embodiment, a method of operating an organic light emitting diode (OLED) display device, may include storing a first lookup table in which voltages for maintaining luminance according to brightness set values are mapped to the brightness set values; acquiring a first minimum voltage for maintaining luminance corresponding to a brightness set value from the first lookup table; and supplying the first minimum voltage to an OLED.

The method may further include receiving a command for changing the brightness set value from the remote control device; and supplying a second minimum voltage for maintaining luminance corresponding to the changed brightness set value to the OLED, and the first minimum voltage and the second minimum voltage may be determined to be a smallest voltage of voltages acquired from the first lookup table.

The method may further include storing a second lookup table in which voltages for maintaining luminance according to a plurality of secondary color distributions are mapped to the plurality of secondary color distributions; performing sensing to detect a secondary color of the OLED; and when the secondary color is detected as a result of the sensing, analyzing a secondary color distribution, acquiring a third minimum voltage corresponding to the analyzed secondary color distribution from the second lookup table, and supplying the third minimum voltage to the OLED, and the third minimum voltage may be a voltage higher than the first minimum voltage.

BRIEF DESCRIPTION OF THE DRAWINGS

FIG. 13 illustrates a lookup table in which voltages for maintaining luminance are mapped to OLED brightness set ranges according to an embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
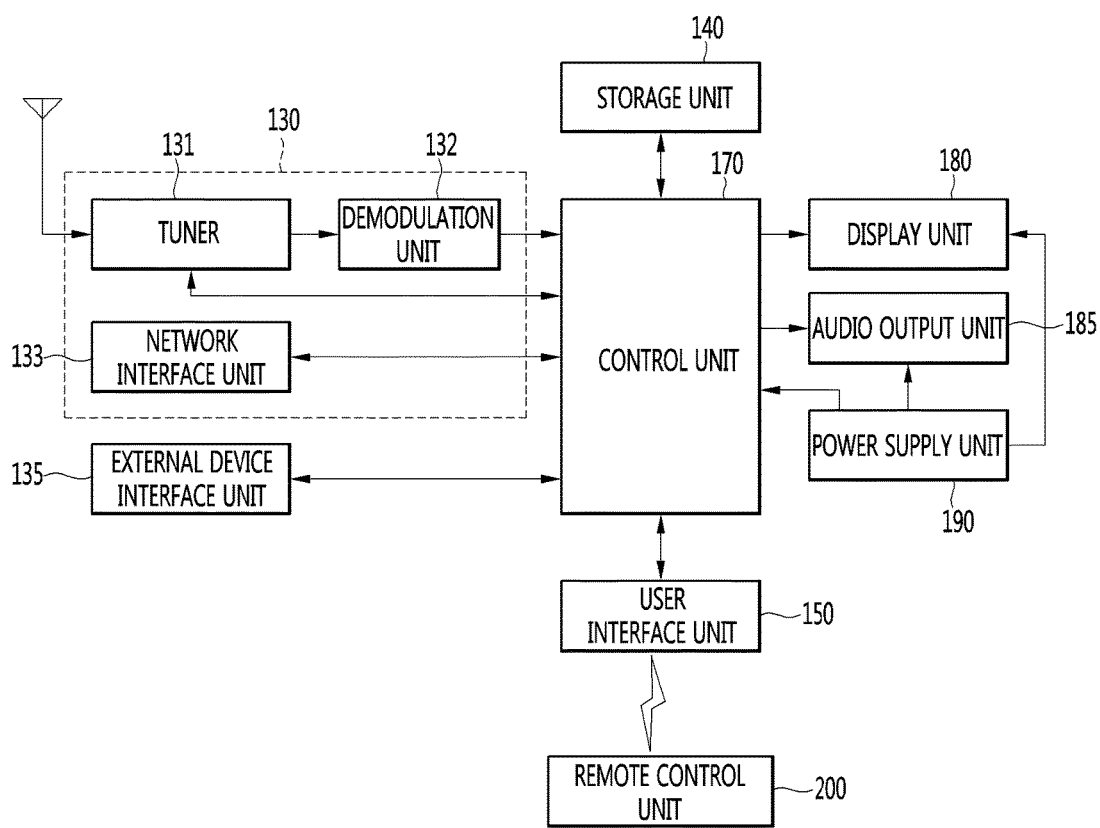
FIG. 1 is a block diagram of a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control unit 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
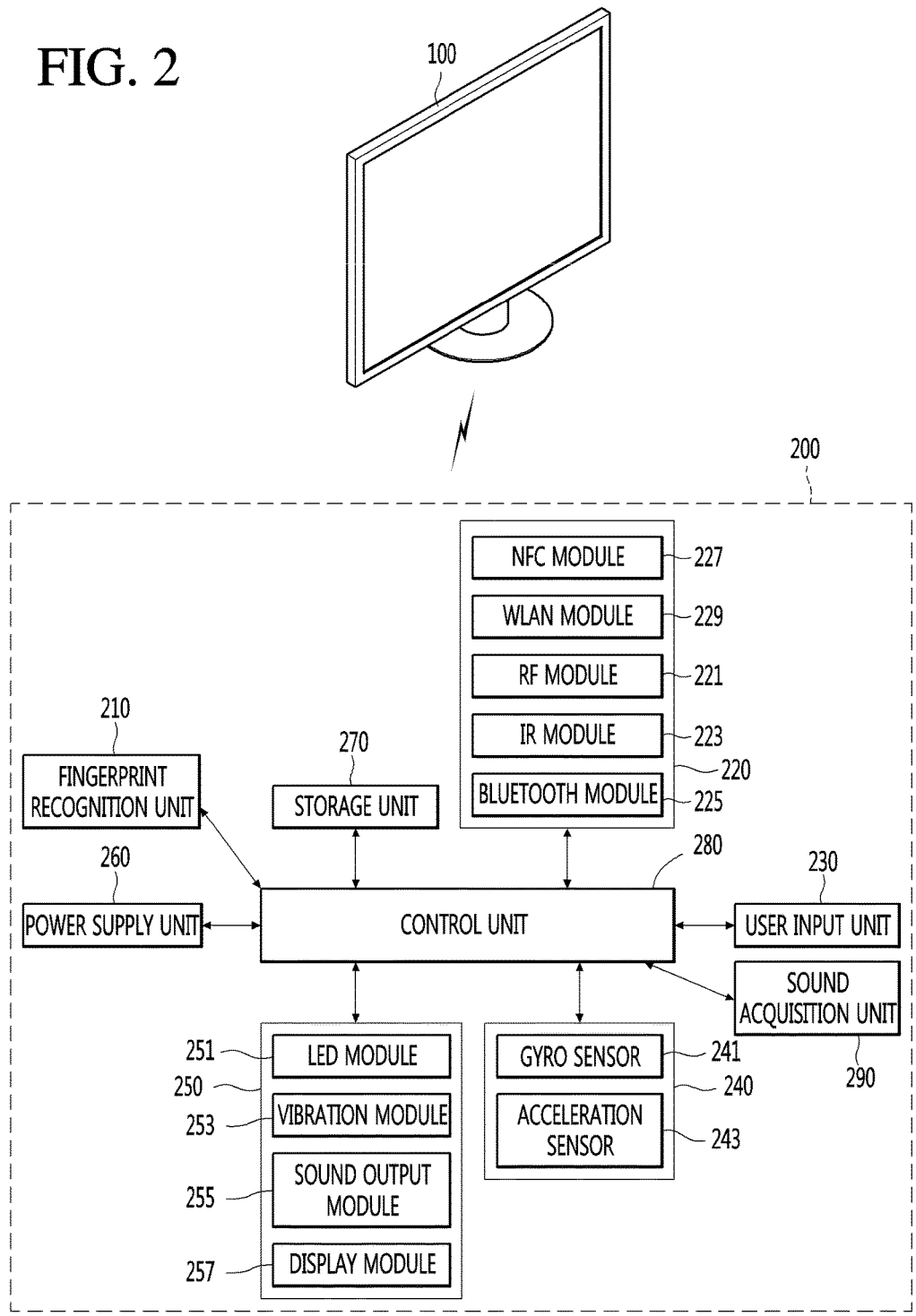
FIG. 2 is a block diagram of a remote control device according to an embodiment of the present invention.
Figure 3:
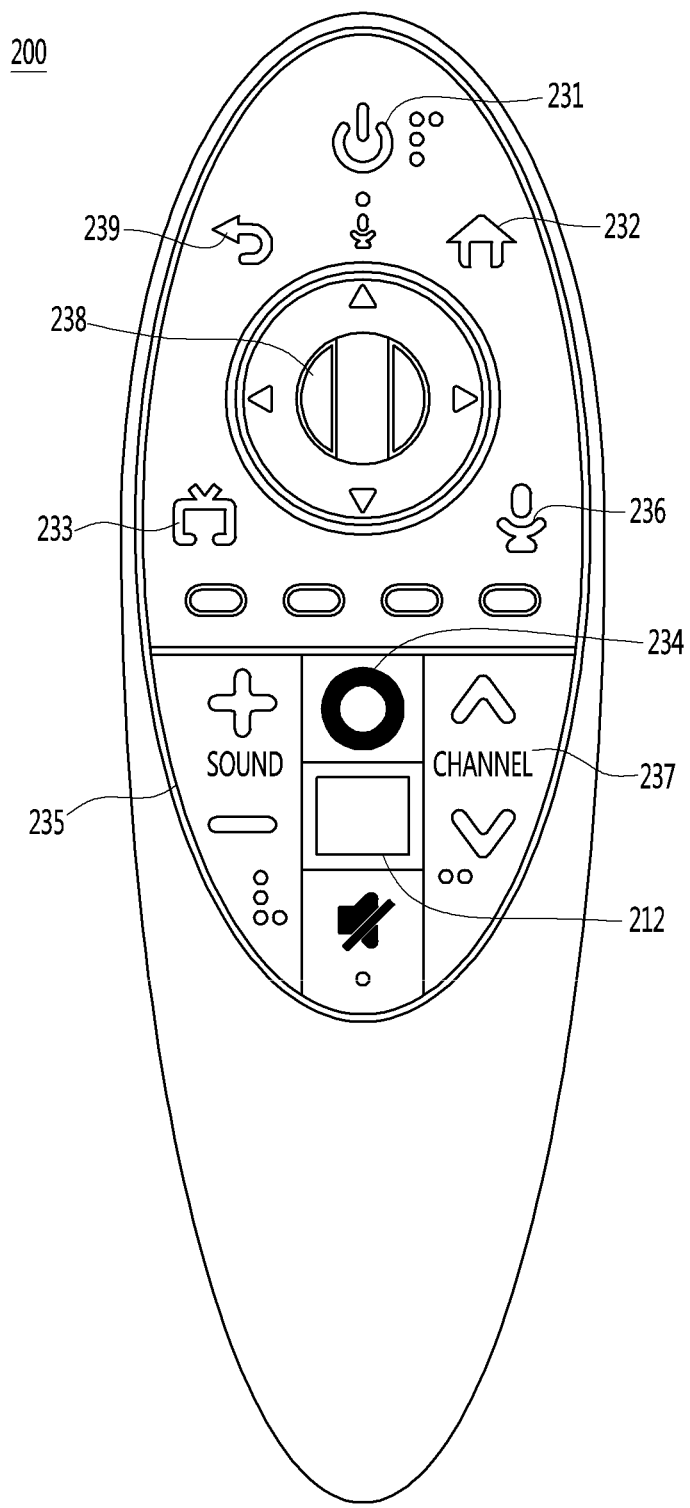
FIG. 3 is a diagram illustrating an actual configuration example of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 230 or corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Figure 4:
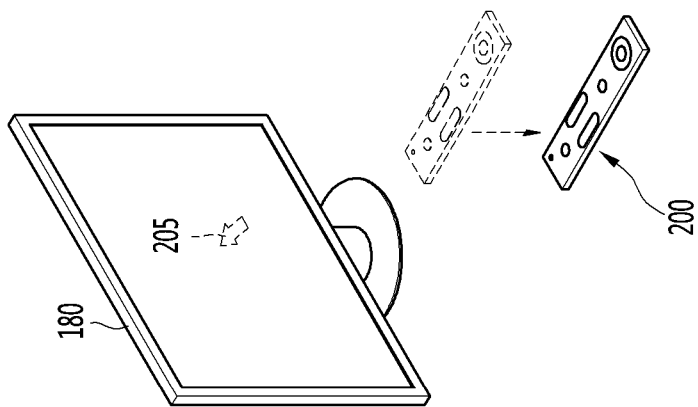
FIGS. 4A-C illustrate an example in which a remote control device is used according to an embodiment of the present invention.
Figure 4:
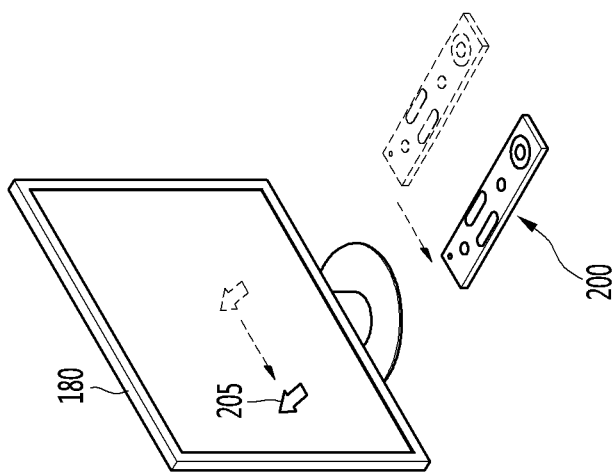
Figure 4:
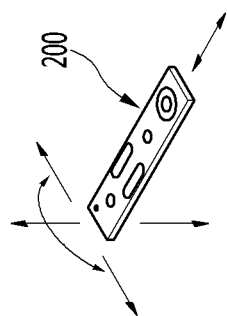
Figure 4:
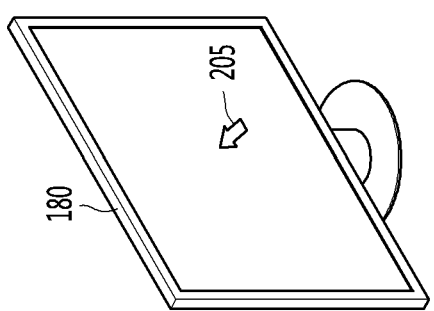

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, the working principle of an OLED will be described with reference to FIG. 5.

Figure 5:
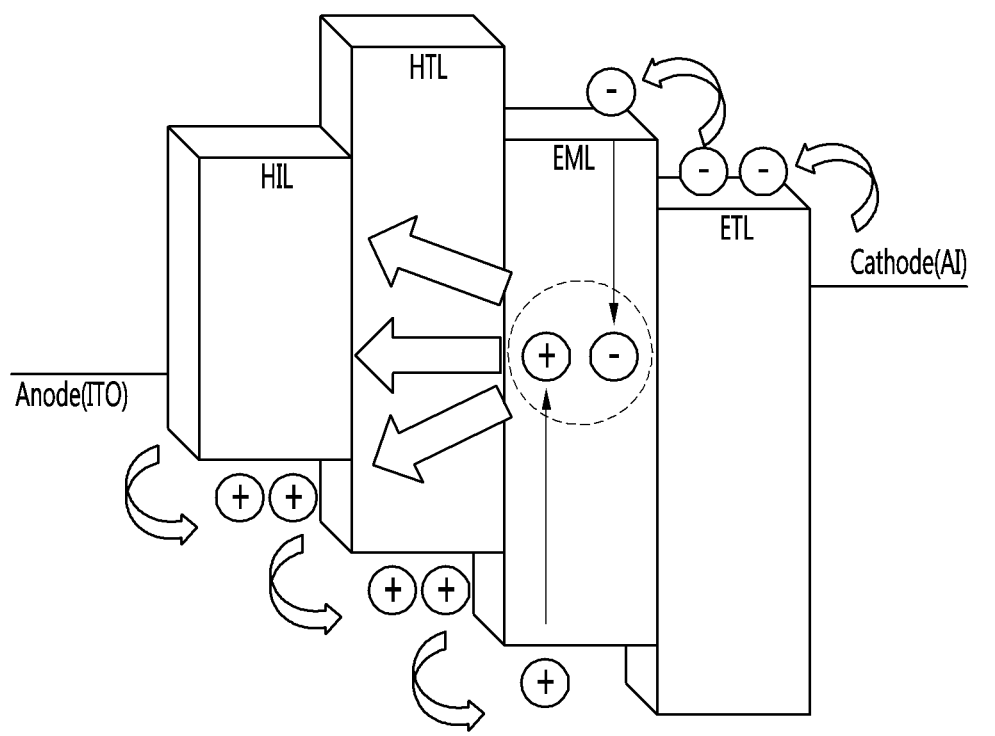
FIG. 5 is a diagram for describing the working principle of an organic light emitting diode (OLED) according to an embodiment of the present invention.

FIG. 5 is a diagram for describing the working principle of the OLED.

The OLED is generally structured in such a way to form a transparent Indium Tin Oxide (ITO) anode layer on a transparent substrate, such as glass, and sequentially form a multilayer thin film of various organic materials and a cathode of Mg—Ag alloy.

The anode layer includes anode and cathode and is implemented as a transparent electrode, such as ITO, such that light generated in an emitting layer is transmitted to the outside. Since the OLED is an electron injection-type light emitting device, electron injection efficiency in the interfaces thereof is a main factor greatly affecting the performance of the OLED.

Next, the emitting layer (EML) is a layer in which light is generated in such a way that holes (+), which have passed through the anode, and electrons (−), which have passed passing through the cathode, meet.

Specifically, in the OLED, when a voltage is applied between two electrodes, the holes are injected from the anode and the electrodes are injected from the cathode. When the holes injected from the anode and the electrons injected from the cathode reach the emitting layer, the electrons and the holes meet to form an exciton that is an excited state. The exciton emits light trough light emitting recombination and transitions to the ground state. In this case, an emitting wavelength is determined by the energy of the exciton, that is, an energy difference between HOMO- LUMO and the light generated in the emitting layer is released toward the transparent electrode (anode). The light generated in the emitting layer has red, blue, and green emitting colors, and the spectrum thereof is determined according to combination energy. Therefore, the emitting colors are determined depending on materials forming the emitting layer.

The emitting layer includes a hole injection layer (HIL), a hole transport layer (HTL), and electron transport layer (ETL) in order to facilitate easy movement of the hole and electron to the emitting layer.

The hole transport layer may be formed of electron donor molecules having low ionization potential to facilitate the injection of holes from the anode, and may be formed of diamine, triamine, or tetra-amine derivatives having triphenylamine as a basic skeleton.

The electron transfer layer is a layer for smoothly transferring electrons supplied from the cathode to the emitting layer and increasing recombination opportunity in the emitting layer by blocking movement of holes which are not combined in the emitting layer, and needs to have excellent electron affinity and excellent adhesion to a cathode electrode.

Next, an operation of a pixel circuit connected to the OLED will be described with reference to FIG. 6.

Figure 6:
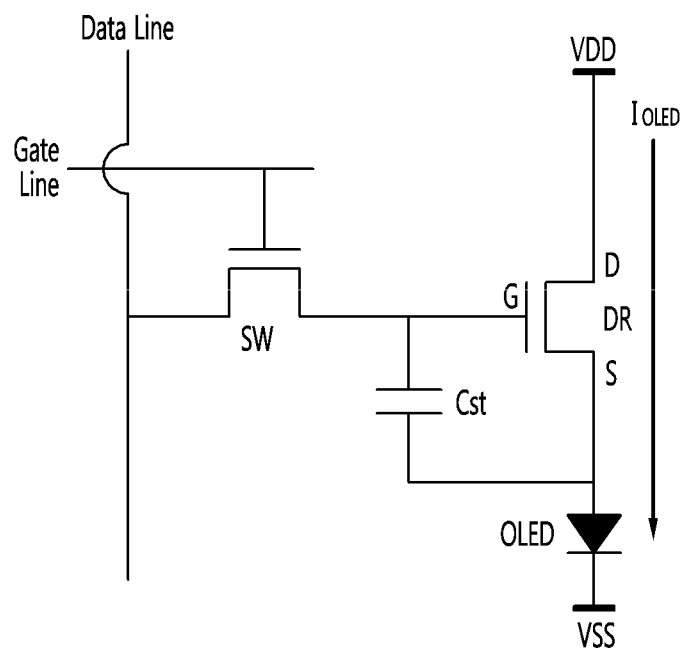
FIG. 6 is an equivalent circuit diagram of a pixel connected to an organic light emitting diode according to an embodiment of the present invention.

FIG. 6 is an equivalent circuit diagram of a pixel connected to an OLED.

Each pixel of the OLED display device includes two transistors and a single capacitor 2T1C. Referring to FIG. 6, the pixel of the OLED display device includes a data line Data Line and a gate line Gate Line intersecting with each other, a switch TFT SW, a driving TFT DR, and a storage capacitor Cst.

The switch TFT SW makes a current path between the source electrode and drain electrode thereof conductive by being turned on in response to a scan pulse from the gate line Gate Line. During a time of period when the switch TFT SW is turned on, a data voltage from the data line Data Line is applied to the gate electrode of the driving TFT DR and one electrode of the storage capacitor Cst through the source electrode and drain electrode of the switch TFT SW.

The storage capacitor Cst stores a difference voltage between the data voltage and a high-potential driving voltage VDD and keeps the difference voltage uniform during a frame period. The driving TFT DR controls a current IOLED flowing through the OLED due to the data voltage applied to the gate electrode thereof.

The source-drain voltage of the TFT is determined by the driving voltage VDD applied to the OLED. On the other hand, the driving voltage VDD applied to the OLED is changed due to other causes, such as degradation, temperature, or grayscale data of the OLED. Therefore, in order to operate the TFT as a constant current source even when the driving voltage VDD of the OLED is changed, a predetermined margin range is provided upon application of the driving voltage VDD. Such a margin may cause unnecessary power consumption in the display device.

Therefore, according to embodiments of the present invention, reduction in power consumption of the OLED display device is achieved by lowering a voltage which is higher than a necessary voltage, which is supplied to the OLED display device.

In order to describe a power consumption reduction method according to the present invention, first, drain characteristics of a transistor of a pixel circuit connected to the OLED will be described with reference to FIG. 7.

Figure 7:
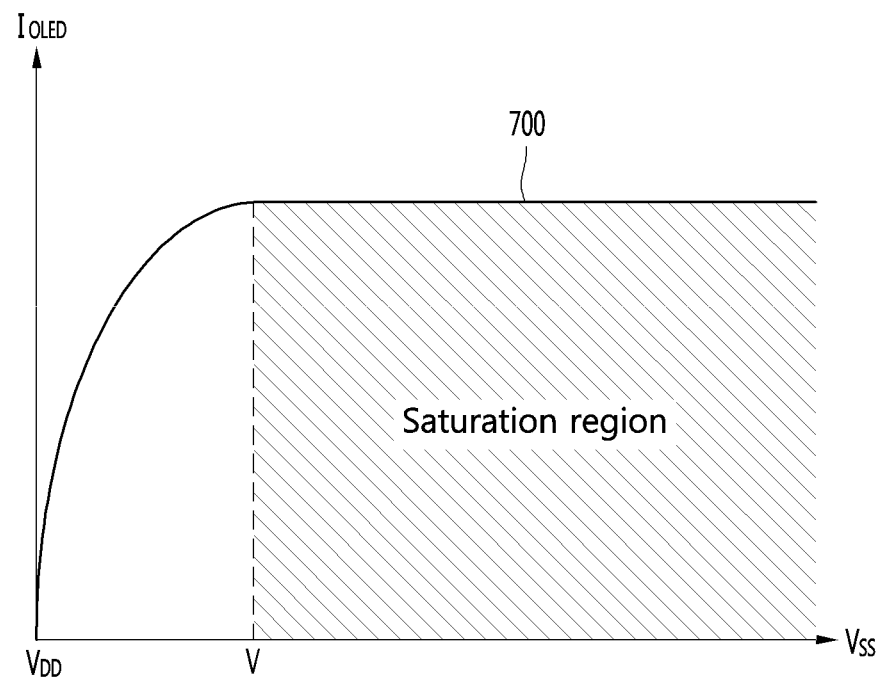
FIG. 7 is a graph for describing a current curve IOLED for a driving TFT (DR) of the pixel circuit connected to the OLED according to an embodiment of the present invention.

FIG. 7 is a graph for describing a current curve IOLED of the driving TFT (DR) of the pixel circuit connected to the OLED.

The curve 700 illustrated in FIG. 7 represents a current with respect to a drain-source voltage. The curve 700 is linear in the initial portion thereof and is substantially flat after the initial portion. A field effect transistor (FET) operates in a saturation region which is substantially flat.

Therefore, the EFT operates in the saturation region even when a voltage equal to or higher than a reference voltage is supplied thereto, resulting in no increase in the current in proportion to the voltage. That is, since the current IOLED remains the same even when a voltage equal to or higher than a reference voltage is supplied to the EFT, the EFT may consume excessive power when the voltage equal to or higher than the reference voltage is supplied to the EFT.

Therefore, there is a need for a method of lowering a voltage equal to or higher than the reference voltage, which is excessively supplied, to a predetermined voltage level in order to reduce power consumption in the EFT. According to embodiments of the present invention, it is possible to reduce power consumption while maintaining luminance of an OLED display device by using the method of lowering a voltage which is excessively supplied to the EFT. To this end, first, a voltage at which saturation starts is acquired from a current curve of the EFT. The power consumption is reduced by lowering a voltage exceeding the voltage at which saturation occurs.

A method by which the display device 100 reduces power consumption while maintaining luminance according to an embodiment of the present invention will be described with reference to FIG. 8.

Figure 8:
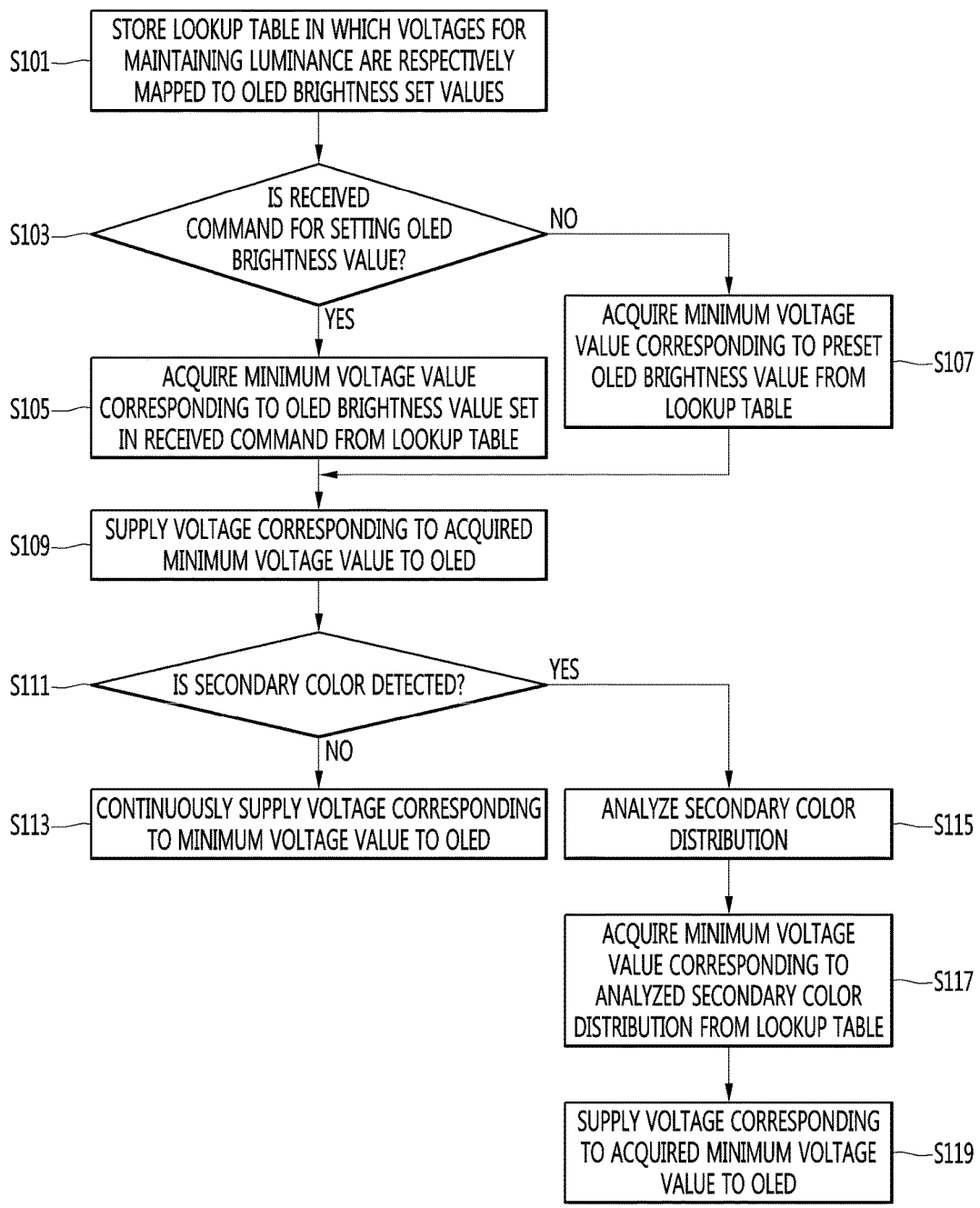
FIG. 8 is a flowchart of a method of reducing power consumption while maintaining the brightness in a OLED display device according to an embodiment of the present invention.

FIG. 8 is a flowchart of a method of reducing power consumption while maintaining luminance in OLED display device according to an embodiment of the present invention.

The control unit 170 stores, in the storage unit 140, a lookup table which minimum voltages for maintaining the luminance are mapped to OLED brightness set ranges (that is, as the OLED brightness set range is changed) (S101).

Also, the control unit 170 may further store, in the storage unit 140, a lookup table in which voltages for maintaining luminance are mapped to a plurality of secondary color distributions. A method of mapping a plurality of secondary color distributions to voltages for maintaining luminance and storing a lookup table may be descried in detail later.

The method of storing voltages for maintaining luminance according to OLED brightness set ranges in a lookup table will be described with reference to FIGS. 9 to 12.

First, luminance characteristics of an OLED according to an average picture level (APL) will be described with reference to FIG. 9.

Figure 9:
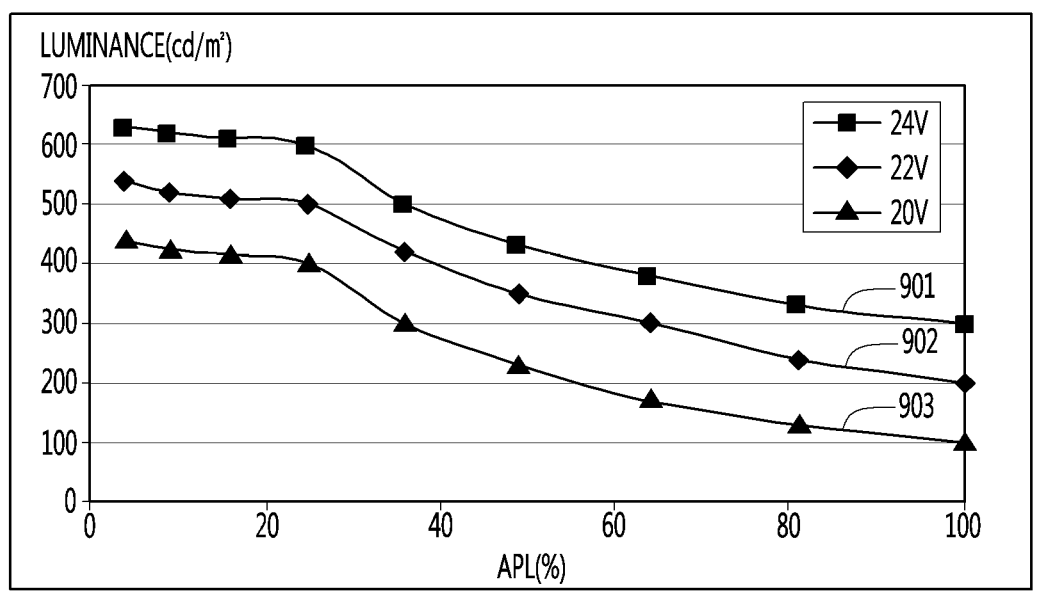
FIG. 9 is a graph in which luminance curves according to average picture levels (APLs) of an OLED are plotted with respect to voltages according to an embodiment of the present invention.

FIG. 9 is a graph showing a curve of luminance according to an APL of an OLED with respect to voltages.

Specifically, FIG. 9 shows a curve of luminance according to an APL when the OLED brightness of an OLED display device is set to 100. The embodiments are not limited thereto. That is, unlike FIG. 9, the curve of luminance according to the APL may be made when the OLED brightness of the OLED display device is set to a value other than 100.

A first luminance curve 901 of FIG. 9 is a curve of luminance according to the APL when a voltage is 24V, a second luminance curve 902 of FIG. 9 is a curve of luminance according to the APL when a voltage is 22V, and a third brightness curve 903 of FIG. 9 is a curve of luminance according to the APL when a voltage is 20V.

The x axis of the graph represents an APL (%) and the y axis of the graph represents luminance (cd/m2). The APL increases toward the right along the x axis of the graph, and the luminance increases toward the top along the y axis of the graph.

The APL is the acronym of an average picture level and represents an area of a white region of an overall screen. Generally, the display device needs to perform color reproduction in consideration of the brightness of the entire display. Therefore, a pixel connected to an OLED emits light with higher luminance as the APL is smaller. It can be seen from the first to third luminance curves 901 to 903 that as the APL is smaller, the luminance is higher and as the APL is larger, the luminance is lower.

Generally, as a supply voltage increases, the luminance is higher. It can be seen from the first to third the luminance curves 901 to 903 that the first luminance curve 901 in which the supply voltage is highest represents high luminance, and the third brightness curve 903 in which the supply voltage is lowest represents low luminance.

The method of acquiring voltages for maintaining luminance according to OLED brightness set ranges will be described with reference to FIGS. 10 to 12.

First, a method of setting an OLED brightness of the OLED display device 100 will be described with reference to FIG. 10.

Figure 10:
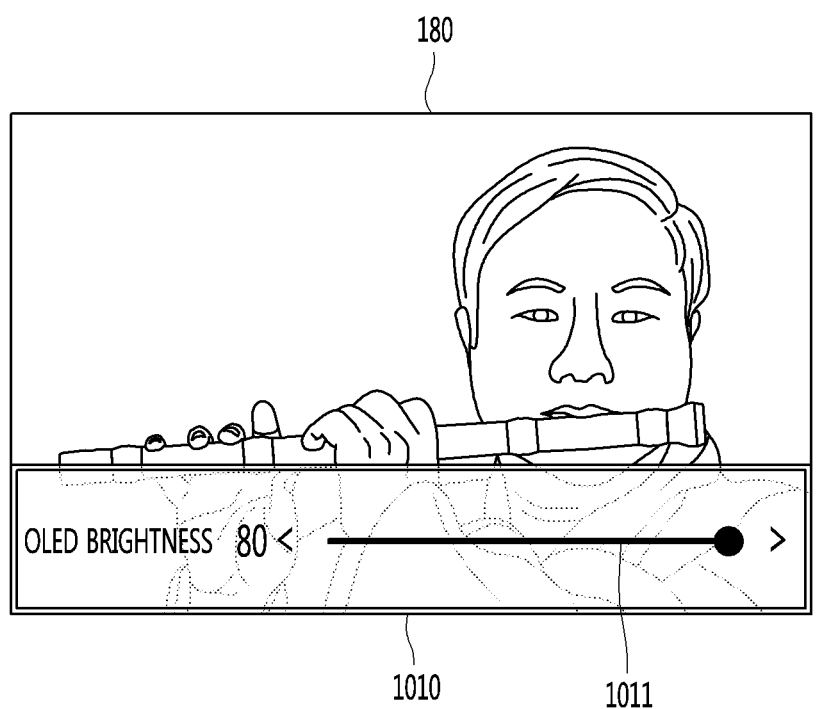
FIG. 10 illustrates an example of a setting screen for OLED brightness of an OLED display device according to an embodiment of the present invention.

FIG. 10 illustrates an example of a setting screen for the OLED brightness of the OLED display device.

The control unit 170 may set the OLED brightness of the OLED display device 100 through an OLED brightness setting item 1010 displayed on the display unit 180. That is, the control unit 170 controls an OLED to emit light corresponding to an adjusted brightness set value by adjusting the brightness set value of the OLED brightness setting item 1010.

The user may change the brightness set value of the OLED display device in order to adjust the brightness of an image displayed on the OLED display device, or in order to adjust power consumption of the OLED display device.

Therefore, as the brightness set value which is adjusted through the OLED brightness setting item 1010 is larger, the OLED emits stronger light. In addition, as the brightness set value is smaller, the OLED emits weaker light. Similarly, as an adjustment bar 1011 of the OLED brightness setting item 1010 is slid to the light, the OLED emits stronger light. In addition, as the adjustment bar 1011 is slid to the left, the OLED emits weaker light.

The adjustment bar 1011 of the OLED brightness setting item 1010 may be adjusted through a button included in the OLED display device 100 or may be adjusted by receiving a signal from the remote control device 200.

Next, the luminance of the OLED display device 100 according to a change in the OLED brightness set value will be described with reference to FIG. 11.

Figure 11:
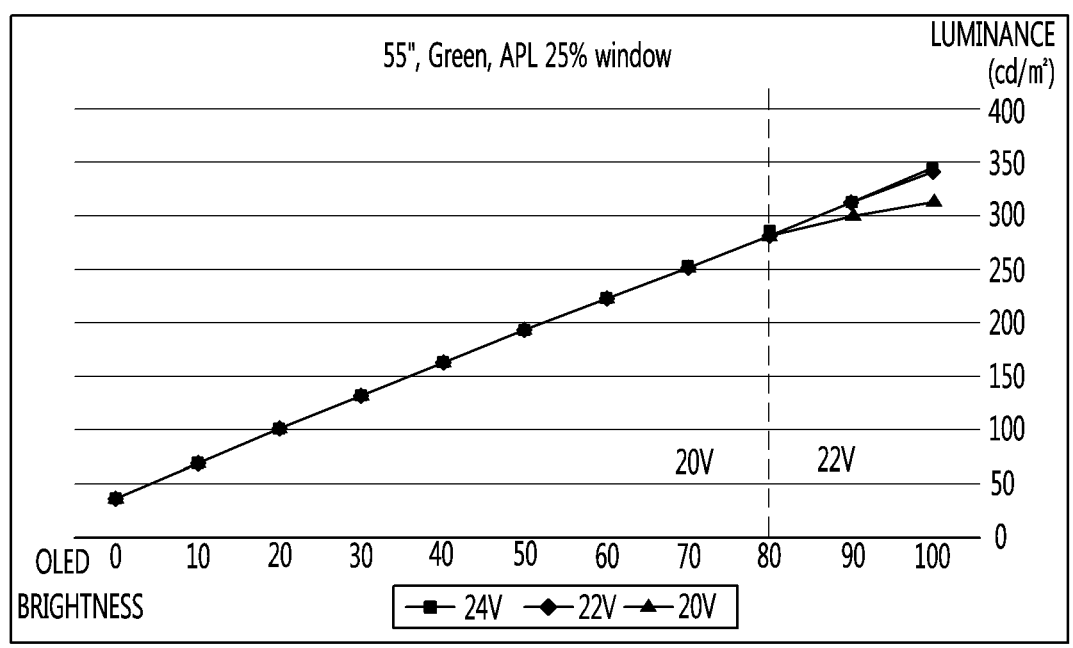
FIGS. 11 and 12 are graphs showing a change in luminance according to OLED brightness set values of an OLED display device with respect to voltages according to an embodiment of the present invention.
Figure 12:
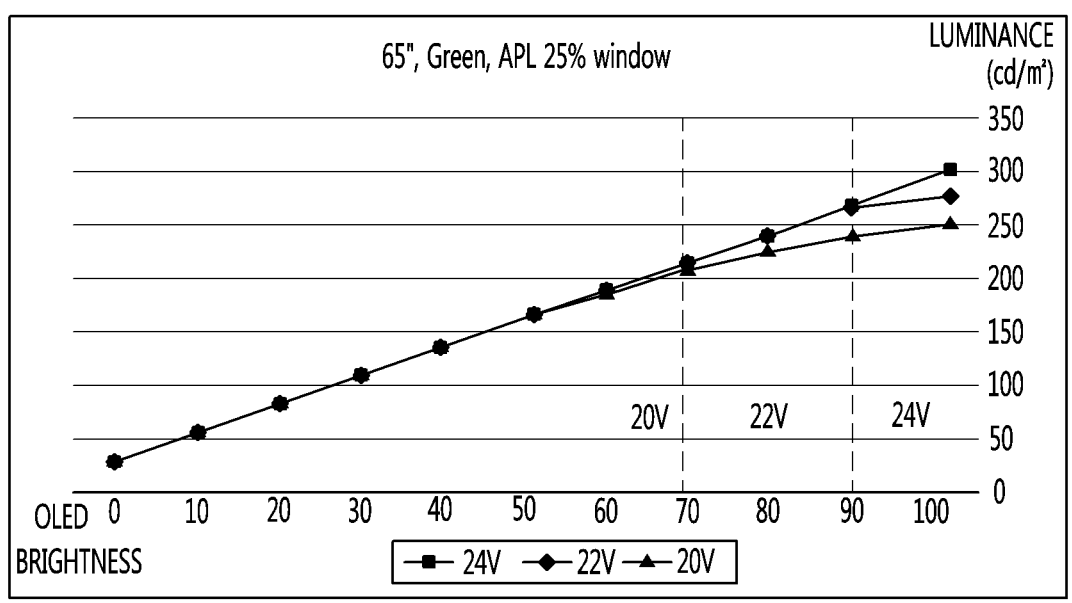

FIGS. 11 and 12 are graphs showing a change in the luminance according to the OLED brightness set value of the OLED display device with respect to voltages.

Specifically, FIG. 11 illustrates an example in which a change in the luminance according to a change in the OLED brightness set value are detected with respect to a green element, when the APL of the OLED display device 100 is 25(%) window. The reason why detection is performed with respect to the green element when the APL is 25(%) window is that the luminance of the green element most largely decreases from among white, red, green, and blue elements when the APL is 25(%) window. Therefore, in a case where the APL is 25(%) window, when the minimum voltage for maintaining luminance with respect to the green element is supplied, it is predicted that the OLED display device 101 can maintain luminance.

It can be seen from FIG. 11 that the same luminance is maintained regardless of a voltage when the OLED brightness is set to fall within a range of from 0 to 80.

However, when the OLED brightness is set to fall within a range of from 80 to 100, the luminance is changed depending on the voltage. In particular, when the OLED brightness is set to fall within the range of from 80 to 100, the luminance decreases as the voltage decreases.

Specifically, in a case where a voltage of 24V is supplied, when the OLED brightness is set to 90, the luminance is about 320, and when the OLED brightness is set to 100, the luminance is about 350.

Also, even in a case where a voltage of 22V is supplied, when the OLED brightness is set to 90, the luminance is about 320, and when the OLED brightness set value is 100, the luminance is about 350, so that the same luminance as the case where the voltage of 24V is supplied is maintained.

On the other hand, in a case where a voltage of 20V is supplied, when the OLED brightness set value is 90, the luminance is about 300, and when the OLED brightness set value is 100, the luminance is about 310. That is, when the voltage of 20V is supplied, the luminance decreases compared to the case where the voltage of 24V or the voltage of 22V is supplied. That is, it can be seen that, in a case where the supply voltage is lowered to the voltage of 20V, the luminance is not maintained when the OLED brightness set range is within the range of from 80 to 100.

Therefore, in a case where the OLED brightness set range is within the range of from 0 to 80, the luminance is maintained when the supply voltage is 24V, 22V, and 20V. However, in a case where the OLED brightness set range is within the range of from 80 to 100, the luminance is maintained only when the voltage of 22V is supplied, and the luminance is not maintained when the voltage of 20V is supplied.

Therefore, the minimum voltage for maintaining the luminance is 20V when the OLED brightness is set to fall within the range of from 0 to 80, and the minimum voltage for maintaining the luminance is 22V when the OLED brightness is set to fall within the range of from 80 to 100.

Next, referring to FIG. 12, there will be described a result of detecting a change in luminance according to a change in the OLED brightness with respect to the green element when the APL is 25(%) window in a 66-inch OLED display device 100.

Referring to FIG. 12, the luminance is maintained regardless of a voltage when the OLED brightness is set to fall within a range of from 0 to 70. However, the OLED brightness is set to fall within a range of from 70 to 100, the luminance is changed as the voltage is changed.

Specifically, in a case where a voltage of 24V is supplied, when the OLED brightness is set to 80, the luminance is about 240, when the OLED brightness is set to 90, the luminance is about 270, and when the OLED brightness is set to 100, the luminance is about 300.

On the other hand, in a case where a voltage of 22V is supplied, when the OLED brightness is set to 80, the luminance is about 240, when the OLED brightness is set to 90, the luminance is about 270, and when the OLED brightness is set to 100, the luminance is about 275. That is, it can be seen that, in a case where when the supply voltage is 22V, when the OLED brightness set range is within the range of from 80 to 90, the luminance is maintained like the case in which the supply voltage is 24V, whereas, when the OLED brightness set rage is within the range of from 90 to 100, the luminance is not maintained.

Also, in a case where a voltage of 20V is supplied, when the OLED brightness is set to 80, the luminance is about 230, when the OLED brightness is set to 90, the luminance is about 240, and when the OLED brightness is set to 100, the luminance is about 250. That is, it can be seen that, in a case where the supply voltage is 20V, the luminance is not maintained when the OLED brightness is set to fall within the range of from 70 to 100.

Therefore, in a case where the OLED brightness set range is within the range of from 0 to 70, the luminance is maintained when the supply voltage is 24V, 22V, and 20V. However, in a case where the OLED brightness set range is within the range of from 70 to 90, the luminance is maintained only when the supply voltage is 22V, and the luminance is not maintained when the supply voltage is 20V. In addition, in a case where the OLED brightness set range is within the range of from 90 to 100, the luminance is not maintained even when the supply voltage is 22V. Therefore, when the OLED brightness set range is within the range of from 0 to 70, the minimum voltage for maintaining the luminance is 20V, and when the OLED brightness set range is within the range of from 70 to 90, the minimum voltage for maintaining the luminance is 22V. Furthermore, when the OLED brightness set range is within the range of from 90 to 100, the minimum voltage for maintaining the luminance is 24V.

Next, referring to FIG. 13, there will be described a lookup table in which the minimum voltages for maintaining the luminance are mapped to the OLED brightness set ranges based on the results obtained through FIGS. 11 and 12.

FIG. 13 illustrates the lookup table in which voltages for maintaining brightness are mapped to the OLED brightness set ranges.

The lookup table may represent a set of results which are calculated for predetermined arithmetic operations in advance. By using the method of calculating result values by the lookup table, it is possible of reduce processing time compared to a method of calculating the results for the predetermined arithmetic operations. According to an embodiment of the present invention, the storage unit 140 may store the lookup table in which voltages for maintaining luminance according to OLED brightness set values are mapped to the OLED brightness set values. For example, the storage unit 140 may store the lookup table as illustrated in FIG. 13. The lookup table illustrated in FIG. 13 is a table storing voltages for maintaining the luminance according to the OLED brightness set ranges, which are mapped to the OLED brightness set ranges.

The OLED display device 100 may store a lookup table suitable to internal properties of each display device. That is, the OLED display device 100 may store a lookup table suitable to a size, a resolution, and the like of a display panel.

The storage unit 140 may previously store the table as illustrated in FIG. 13 by measuring voltages for maintaining the luminance according to the OLED brightness set ranges upon product shipping.

Alternatively, the storage unit 140 may store the table as illustrated in FIG. 13 by measuring voltages for maintaining the luminance according to the OLED brightness set ranges while changing the OLED brightness set value after product shipping.

Also alternatively, the storage unit 140 may update and store the data of a previously-stored lookup table. Specifically, the control unit 170 may periodically update the lookup table at a preset period. The update period may be set in the OLED display device 100 by default. Alternatively, the update period may be set arbitrarily by receiving the user's command.

Also, the control unit 170 may update the lookup table every time when the user provides an update command manually.

Also alternatively, the control unit 170 may determine whether it is necessary to update the lookup table, and display an update request message for requesting update of the lookup table from the user on the display unit 180.

The user may see the update request message for the lookup table displayed on the display unit 180 and provide the update command for the lookup table to the OLED display device 100.

The reason why the update for the lookup table is requested is that the performance of an OLED element may be degraded as the display device 100 is used for a long time after product shipping. When the performance of the OLED element is degraded, a minimum voltage for maintaining the luminance, which corresponds to an OLED brightness set value may be changed. Specifically, when the performance of the OLED element is degraded, the minimum voltage for maintaining the luminance, which corresponds to the OLED brightness set value may increase. Therefore, when the data of the lookup table is continuously used without update, the luminance may not be maintained even through the voltage indicated in the lookup table is supplied. Accordingly, as the voltage for maintaining the luminance is changed, the update for the lookup table is required in order to reflect the changed voltage.

The method of updating the lookup table according to an embodiment of the present invention will be described below.

According to an embodiment of the present invention, the control unit 170 may update the lookup table by measuring a voltage for maintaining the luminance while changing the OLED brightness set value. Specifically, the control unit 170 may update the lookup table by measuring a voltage for maintaining the luminance while incrementing the OLED brightness set value by one step in step-wise fashion. Alternatively, the control unit 170 may update the lookup table by measuring a voltage for maintaining the luminance while decrementing the OLED brightness set value by one step in step-wise fashion. In this case, the one step may mean a set unit of the OLED brightness used in the OLED display device 100.

According to another embodiment of the present invention, the control unit 170 may receive a command for changing the OLED brightness set value. The control unit 170 may update the lookup table by measuring minimum voltages for maintaining the luminance, which respectively correspond to the changed OLED brightness set values. To this end, the user may input a signal for changing the OLED brightness set value. In this way, when the voltages are updated only for the OLED brightness set values corresponding to the command received from the user, necessary data only is updated, thus shortening processing time. Also, by using the above-described method, the minimum voltages may be stored only for some of the OLED brightness set values, not the entire of the OLED brightness set range. Therefore, it is possible to reduce a space occupied by the lookup table in the storage unit 140. The space of the storage unit 140 may be saved by storing necessary voltages only for frequently-used OLED brightness set values.

Next, an example of acquiring minimum voltages for maintaining the luminance corresponding to OLED brightness set values from the lookup table will be described with reference to FIG. 13. Referring to the lookup table of FIG. 13, it can be seen that, in the case of a 55-inch OLED display device 100, when an OLED brightness set range is within a range of from 0 to 80, a voltage for maintaining luminance is 20V, and when an OLED brightness set range is within a range of from 0 to 100, a voltage for maintaining luminance is 22V. Therefore, when the OLED brightness set range is within the range of from 0 to 80, a voltage of 20V is acquired as a minimum voltage for maintaining the luminance, and when the OLED brightness set range is within the range of from 80 to 100, a voltage of 22V is acquired as a minimum voltage for maintaining the luminance.

In addition, in the case of a 65-inch OLED display device 100, when the OLED brightness set range is within a range of from 0 to 70, a voltage for maintaining luminance is 20V, when the OLED brightness set range is within a range of from 0 to 90, a voltage for maintaining luminance is 22V, and when the OLED brightness set range is within a range of from 0 to 100, a voltage for maintaining luminance is 24V. Therefore, when the OLED brightness set range is within the range of from 0 to 70, a voltage of 20V is acquired as a minimum voltage for maintaining the luminance, when the OLED brightness set range is within the range of from 70 to 90, a voltage of 22V is acquired as a minimum voltage for maintaining the luminance, and when the OLED brightness set range is within the range of from 90 to 100, a voltage of 24V is acquired as a minimum voltage for maintaining the luminance.

In a case in which the OLED brightness is set to 80 in a 65-inch OLED display device 100, when the voltage of 20V is supplied to an OLED, the luminance of the display device 100 decreases, and when a voltage of 24V is supplied to an OLED, the OLED display device 100 may consume unnecessary power due to a voltage excessively supplied by a voltage of 2V. Therefore, the control unit 170 acquires the voltage of 22V as the minimum voltage for maintaining luminance corresponding to the OLED brightness set value from the lookup table, and supplies the voltage of 22V to the OLEDs, reducing power consumption while maintaining the luminance.

As described above, the control unit 170 stores, in the storage unit 140, a lookup table storing voltages for maintaining the luminance as the OLED brightness set range is changed. It is noted that the above-described specific values are only exemplary, and therefore, embodiments of the present invention are not limited thereto.

In addition, the storage unit 140 may store a lookup table with a different format from that illustrated in FIG. 13. Specifically, the lookup table illustrated in FIG. 13 stores all voltages for maintaining luminance according to the OLED brightness set ranges. Therefore, it is further required that the control unit 170 acquires voltages corresponding to the OLED brightness set values from the lookup table and determines a minimum voltage of among the acquired voltages.

In addition, the storage unit 140 may store a lookup table in which minimum voltages are only mapped to the OLED brightness set values unlike FIG. 13. Therefore, the control unit 170 can acquire minimum voltages corresponding to the OLED brightness set values directly.

The format of the lookup table is only exemplary, and the storage unit 140 may store a lookup table with a different format.

Referring back to FIG. 8, details will be described.

The control unit 170 may receive a command for setting an OLED brightness (S103).

The control unit 170 may receive a command for changing the OLED brightness set value from the remote control device 200. Alternatively, the control unit 170 may receive a command for changing the OLED brightness set value from the remote control device 200, which is generated by using a button (not illustrated) included in the OLED display device 100.

When the command for setting the OLED brightness is received, the control unit 170 acquires a minimum voltage corresponding to the OLED brightness set value which is set in the received command (S105).

When the command for setting the OLED brightness is not received, the control unit 170 acquires a minimum voltage corresponding to a preset OLED brightness value (S107).

An operation of acquiring a minimum voltage according to the OLED brightness value which is set in the received command from the lookup table will be described with reference to FIG. 13.

For example, the control unit 170 may be received a command for setting the OLED brightness value to 80 as illustrated in FIG. 10. In this case, when the OLED display device 100 is a 55-inch TV, the control unit 170 may acquire a voltage of 20V and a voltage of 22V as a voltage for maintaining luminance. Thereafter, the control unit 170 determines the voltage of 20V which is the smallest among the voltage of 20V and the voltage of 22V, as the minimum voltage.

In addition when the command for setting the OLED brightness value to 80 is received and the OLED display device 100 is a 65-inch TV, the control unit 170 may acquire a voltage of 22V and a voltage of 24V as a voltage for maintaining luminance. Thereafter, the control unit 170 determines the voltage of 22V which is the smallest among the voltage of 22V and the voltage of 24V, as the minimum voltage.

As another example, the control unit 170 may not receive a command for setting OLED brightness. In this case, a preset OLED brightness value may be 70. In this case, when the OLED display device 100 is a 55-inch TV, the control unit 170 may acquire a voltage of 20V and a voltage of 22V as a voltage for maintaining luminance. Thereafter, the control unit 170 determines the voltage of 20V which is the smallest among the voltage of 20V and the voltage of 22V, as the minimum voltage.

When the preset OLED brightness value is 70 and the OLED display device 100 is a 65-inch TV, the control unit 170 may acquire a voltage of 20V, a voltage of 22V, and a voltage of 24V as a voltage for maintaining luminance. Thereafter, the control unit 170 determines the voltage of 20V which is the smallest among the voltage of 20V, the voltage of 22V, and the voltage of 24V, as the minimum voltage.

It is noted that the above-described method is only exemplary, and therefore, embodiments of the present invention are not limited thereto.

Referring back to FIG. 8, details will be described.

The control unit 170 performs control such that a voltage corresponding to the minimum voltage acquired in step S105 or S107 is supplied to OLEDs (S109).

The control unit 170 may supply the minimum voltage for maintaining the luminance, which corresponds to the OLED brightness set value, to the OLEDs.

That is, referring to the above-described example, when the OLED brightness set value, which is set in the 55-inch OLED display device 100, is 80, the control unit 170 supplies the voltage of 20V to the OLEDs.

In addition, when the OLED brightness set value, which is set in the 66-inch OLED display device 100, is 80, the control unit 170 supplies the voltage of 22V to the OLEDs.

As described above, the control unit 170 supplies a voltage determined as the minimum voltage from among the voltages acquired from the lookup table to the OLEDs.

Next, the control unit 170 may sense whether a secondary color of an OLED is detected through color detection (S111).

The control unit 170 may perform color detection on an image output from the OLED display device 100 in order to detect the secondary color.

The secondary color refers to a color created by combining two primary colors. That is, the secondary color means yellow created by combining red and green, cyan created by coming green and blue, and magenta created by combining blue and red. Since the secondary colors are created by combining red, green, and blue, various secondary color distributions may be represented according to an image output from the OLED display device 100.

Also, the control unit 170 may detect color distributions for secondary or higher colors.

When the secondary color is not detected as a result of sensing, the control unit 170 continuously supplies a voltage corresponding to the minimum voltage to the OLEDs (S113).

On the other hand, when the secondary color is detected as a result of sensing, the control unit 170 may analyze the distribution of the secondary color (hereinafter, referred to as a secondary color distribution) (S115).

The secondary color distribution may include a secondary color distribution histogram and a secondary color distribution profile. Specifically, the secondary color distribution histogram may mean a graph representing frequencies of R, G, and B in an image. The secondary color distribution profile may mean a profile formed by connecting the frequencies of R, G, and B in the image. Alternatively, the secondary color distribution profile may represent a graph plotted by accumulating the frequencies of R, G, and B of the image, but is merely exemplary.

In order to express the secondary colors in the OLED display device 100, it is necessary to supply a voltage at least two OLED elements. That is, the control unit 170 needs to supply a voltage higher than the minimum voltage to OLEDs since it is necessary to supply a voltage to at least two of red, green, and blue elements, not one of the red, green and blue elements. In a case where, when the secondary color is detected, the voltage, which has been supplied to one OLED element, is continuously supplied to the OLEDs, there occurs a problem that the luminance decreases compared to a set luminance. Therefore, when the secondary color is detected, a voltage higher than the voltage supplied in step S209 is required. The higher voltage may be acquired through the method of measuring the minimum voltage for maintaining luminance while changing the OLED bigness set value as described above.

That is, even when the secondary color is detected, it is possible to acquire the minimum voltage for maintaining luminance and supply a voltage corresponding to the acquired minimum value to the OLEDs through the same method as described above, leading to reduction in power consumption. On the other hand, minimum voltages for maintaining luminance may be different according to the secondary color distributions. Therefore, the control unit 170 needs to analyze the secondary color distribution.

Specifically, first, the control unit 170 may analyze a histogram of an image output from the OLED display device 100 with respect to each frame. The control unit 170 may analyze R, G, and B histograms of the image output from the OLED display device 100 with respect to each frame.

Figure 14:
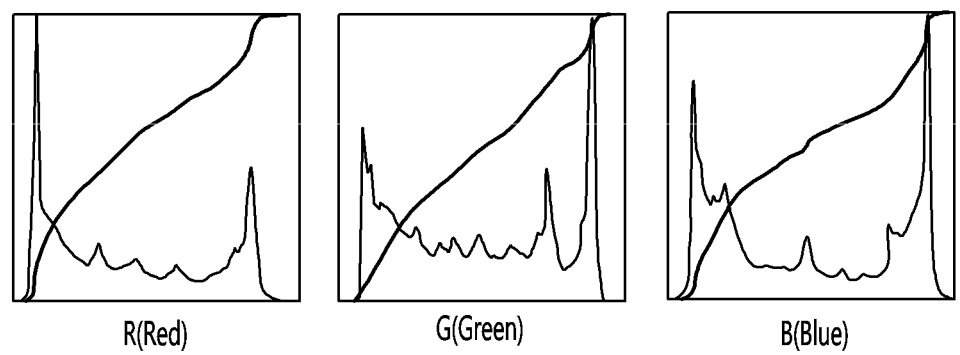
FIG. 14 is a diagram for describing histograms of an image with respect to each frame according to an embodiment of the present invention.

The R, G, and B histograms of one frame may be plotted as illustrated in FIG. 14.

FIG. 14 is a diagram for describing R, G and B histograms of an image with respect to each frame according to an embodiment of the present invention.

As illustrated in FIG. 14, since R, G, and B represents different profiles, histograms of frames may also represent different profiles.

The control unit 170 may analyze the histograms of the image output from the OLED display device 100 with respect to each frame, and analyze a secondary color distribution based on the histogram for each frame. Since the histograms of the frames have various profiles, the secondary color distributions may also various profiles.

Next, the control unit 170 may acquire a minimum voltage corresponding to the analyzed secondary color distribution from the lookup table (S117).

The storage unit 140 may store a lookup table in which voltages for maintaining luminance are mapped to a plurality of secondary color distributions. The voltages to be supplied to OLEDs in order to maintain luminance for the secondary color distributions may be acquired through the same method as described above. For example, the control unit 170 may store a lookup table in which voltages for maintaining the brightness are mapped to a plurality of secondary color distributions in the storage unit 140.

According to an embodiment of the present invention, the lookup table in which the voltages for maintaining luminance are mapped to the plurality of secondary color distributions may have a similar format to that in FIG. 13. For example, the storage unit 140 may store the lookup table in which voltages for maintaining luminance are mapped to the range of R, the range of G, and the range of B, not the OLED brightness set ranges.

As another example, the storage unit 140 may store a lookup table in which voltages are mapped to profiles of the R, G, and B distributions. For example, the storage unit 140 may store a lookup table in which mapping is made such that a voltage of 20V is supplied to OLEDs when a profile of the R, G, or B distribution has a fan shape protruding downward below reference magnitudes, a voltage of 22V is supplied to OLEDs when a profile of the R, G, or B distribution has a fan shape protruding downward over reference magnitudes, and a voltage of 24V is supplied to OLEDs when a profile of the R, G, or B distribution has a fan shape protruding upward. However, the profile and voltage of the R, G, and G distribution are exemplary and are not limited thereto.

As another example, the storage unit 140 may store a lookup table in which voltages are mapped to accumulation graphs of the R, G, and B frequencies. For example, the storage unit 140 may store a lookup table in which mapping is made such that, when a slope of the accumulation graph of the R, G, or B frequencies is equal to or less than a predetermined reference, a voltage of 20V is supplied to OLEDs and when a slope of the accumulation graph of the R, G, or B frequencies exceeds the predetermined reference, a voltage of 22V is supplied to OLEDs.

According to another embodiment of the present invention, the storage unit 140 may store a lookup table in which voltages for maintaining luminance are mapped to secondary color distribution profiles.

However, the format of the lookup table described above is merely exemplary. Therefore, the storage unit 140 may stores various formats of lookup tables in which voltages for maintaining luminance according to secondary color distributions are mapped to the secondary color distributions.

The control unit 170 may acquire a minimum voltage according to the secondary color distribution analyzed in step S115 from the lookup table stored in the storage unit 140.

Referring back to FIG. 8, details will be described.

The control unit 170 may supply a voltage corresponding to the voltage acquired in step S117 to the OLEDs (S119).

As described above, when a secondary color is detected, the control unit 170 supplies a minimum voltage corresponding to a secondary color distribution to the OLEDs, thus reducing power consumption in the OLED display device 100.

Also, when the secondary color is detected, automatic current limit (ACL) gain modulation is further executed, in addition to execution of the above-described method, thus reducing power consumption.

Specifically, an ALC is used to limit an over current. The control unit 170 calculates an overall current of the display unit 180 and a current for each line in real time and predicts whether the over current occurs in advance. When the over current is predicted, the control unit 170 may limit the over current through data and ACL gain modulation.

Figure 15:
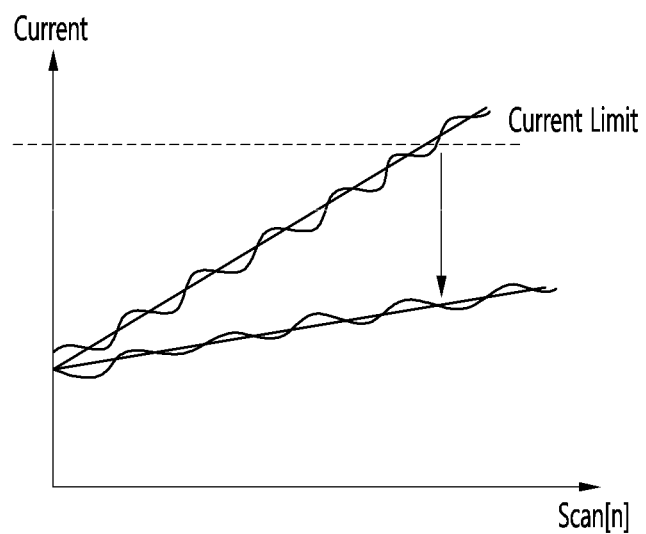
FIG. 15 is a graph showing suppression of an over current in order for reduction in power consumption when a secondary color is detected, according to an embodiment of the present invention.

FIG. 15 is a graph showing suppression of an over current in order for reduction in power consumption when a secondary color is detected, according to an embodiment of the present invention.

The control unit 170 may predict an over current exceeding a current limit by synchronizing image data with the ACL gain by using a frame memory. When the over current is predicted, the control unit 170 lowers the current as illustrated in FIG. 15, thus preventing occurrence of the over current in advance. Therefore, it is possible to effectively reduce power consumption in the OLED display device 100 even when the secondary color is detected.

According to the various embodiments of the present invention, it is possible to reduce power consumption while maintaining luminance of an OLED display device.

According to an embodiment, the foregoing method can also be embodied as computer readable codes on a processor readable recording medium. Examples of the processor readable recording medium include read-only memory (ROM), random-access memory (RAM), CD-ROMs, magnetic tapes, floppy disks, optical data storage devices, and carrier waves (such as, transmission through the Internet).

As can be seen from the foregoing, the mobile terminal is not limited to the configuration and method of the embodiments described above, but all or some components of the embodiments may be configured to be selectively combined such that various modifications of the embodiments can be implemented.

What is claimed is:

1. An organic light emitting diode (OLED) display device, comprising:
 a power supply configured to supply a voltage to an OLED;
 a storage configured to store a first lookup table in which voltages for maintaining luminance are respectively mapped to brightness set values; and
 a controller configured to:
  control the power supply to supply a first minimum voltage for maintaining luminance corresponding to a brightness set value to the OLED,
  when a command for changing the brightness set value is received from a remote control device, acquire a second minimum voltage corresponding to the changed brightness set value from the stored first lookup table, and control the power supply to supply voltage corresponding to the second minimum voltage to the OLED,
 wherein the storage is further configured to store a second lookup table in which voltages for maintaining luminance are mapped to a plurality of secondary color distributions,
 the controller further configured to:
  perform sensing to detect a secondary color of the OLED,
  when the secondary color is not detected as a result of the sensing, control the power supply to supply the first minimum voltage to the OLED, and
  when the secondary color is detected as a result of the sensing, analyze a secondary color distribution, acquire a third minimum voltage corresponding to the analyzed secondary color distribution from the second lookup table, and control the power supply to supply voltage corresponding the third minimum voltage to the OLED, and
 wherein the third minimum voltage is a voltage higher than the first minimum voltage.

2. The OLED display device of claim 1, wherein the first minimum voltage is determined to be a smallest voltage of voltages acquired from the first lookup table.

3. The OLED display device of claim 1, wherein the first lookup table is periodically updated at a preset period.

4. A method of operating an organic light emitting diode (OLED) display device, comprising:
 storing a first lookup table in which voltages for maintaining luminance are respectively mapped to the brightness set values;
 acquiring a first minimum voltage for maintaining luminance corresponding to a brightness set value from the first lookup table;
 supplying the first minimum voltage to an OLED;
 when a command for changing the brightness set value is received from a remote control device, acquiring a second minimum voltage corresponding to the changed brightness set value from the first lookup table, and supplying voltage corresponding to the second minimum voltage to the OLED when a command for changing the brightness set value is received from a remote control device, and
 the method further comprising:
  storing a second lookup table in which voltages for maintaining luminance are respectively mapped to the plurality of secondary color distributions;
  performing sensing to detect a secondary color of the OLED; and
  when the secondary color is not detected as a result of the sensing, controlling the power supply unit to supply the first minimum voltage to the OLED, and
  when the secondary color is detected as a result of the sensing, analyzing a secondary color distribution, acquiring a third minimum voltage corresponding to the analyzed secondary color distribution from the second lookup table, and supplying voltage corresponding to the third minimum voltage to the OLED, and
 wherein the third minimum voltage is a voltage higher than the first minimum voltage.

5. The method of claim 4, further comprising:
 wherein the first minimum voltage and the second minimum voltage are determined to be a smallest voltage of voltages acquired from the first lookup table.

6. The method of claim 4 wherein the first lookup table is periodically updated at a preset period.

\* \* \* \* \*